United States Patent [19]
Witte et al.

[11] 3,835,309
[45] Sept. 10, 1974

[54] ELECTRICAL APPLIANCE POWERED BY SELF-CONTAINED RECHARGEABLE BATTERY

[75] Inventors: Waldemar Witte; Alois Langer, both of Murrhardt, Germany

[73] Assignee: Waldemar Witte, Murrhardt, Panoramaweg, Germany

[22] Filed: Nov. 15, 1972

[21] Appl. No.: 306,548

[30] Foreign Application Priority Data
Nov. 30, 1971 Germany............................ 2159202

[52] U.S. Cl.... 240/10.6 CH, 240/2 CL, 240/10.6 R
[51] Int. Cl.............................................. F21l 9/00
[58] Field of Search...... 240/2 CL, 10.6 CH, 10.6 R

[56] References Cited
UNITED STATES PATENTS
2,299,148  10/1942  Johnson ........................ 240/10.6 R FOREIGN PATENTS OR APPLICATIONS
353,452   5/1961   Switzerland.................. 240/10.6 CH

*Primary Examiner*—Samuel S. Matthews
*Assistant Examiner*—Russell E. Adams, Jr.

[57] ABSTRACT

Electrical appliance such as a pocket flashlight and the like powered by a self-contained rechargeable battery. The appliance is provided with means whereby the batteries thereof may be recharged by inserting an electrical plug on the appliance into the cigarette lighter receptacle of a motor vehicle. A device is also provided whereby the batteries of the appliance may be recharged from the electrical mains of a house. A flashlight made in accordance with the invention may have the lens thereof pivotally mounted so that when the lens is swung away from its operative, light-focusing position on the flashlight, it serves as a magnifying glass to facilitate the examination of a map or the like illuminated by the flashlight.

3 Claims, 6 Drawing Figures

PATENTED SEP 10 1974

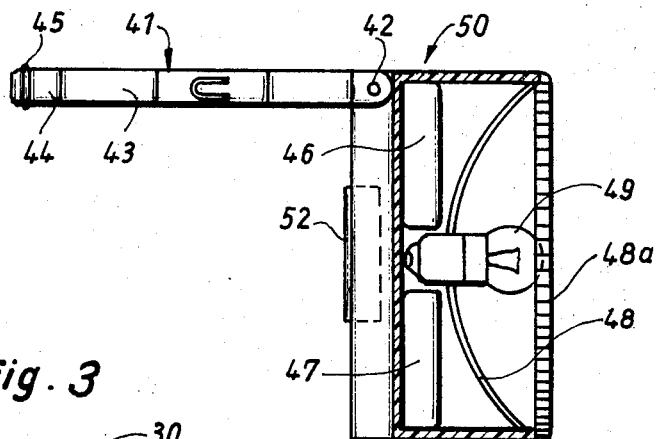
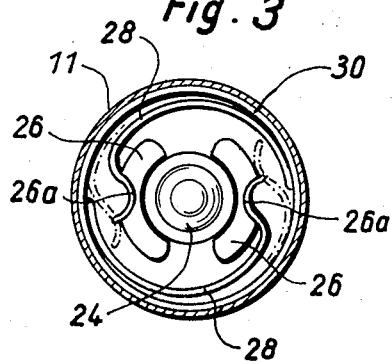
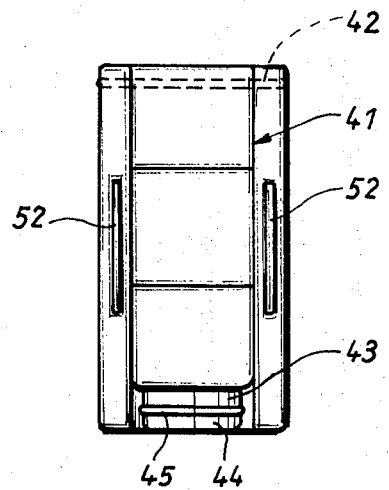

ELECTRICAL APPLIANCE POWERED BY SELF-CONTAINED RECHARGEABLE BATTERY

This invention relates to an electrical appliance such as a pocket flashlight or the like powered by a self-contained rechargeable battery, such appliance including means whereby the batteries of the appliance may be charged by being connected into the electrical system of a motor vehicle.

Many small electrical appliances are provided with self-contained rechargeable batteries. As a rule, such batteries are recharged from the usual house-lighting circuits. In such appliances, two rigid plug pins are provided on the housing of the appliance, such pins being concealed under a removable cap when the appliance is not being charged at an electrical outlet.

It is also known to provide such small electrical appliances, especially pocket flashlights, with a replaceable housing part which receives the plug pins upon the removal of the cap; such replaceable housing part include connecting means and a central plug which can be plugged into the cigarette lighter receptacle of a motor vehicle. With such appliances, the usual cap as well as the replaceable or supplemental housing part must be carried along with the appliance in order to carry out the charging of the batteries of the latter when required. Such supplemental housing and plug arrangements have the disadvantage that, as a rule, when needed they have become lost or at least are not readily available, because they are not built into the small electrical appliance.

There are also known flashlights for motor vehicles, such flashlights being capable of being plugged into a special receptacle in the vehicle, as for example, on the dashboard thereof, for the recharging of the batteries of the flashlight. Such flashlights have the advantage that they can be used immediately at any time or place, and also can be recharged readily, but they have the drawback that a special plug device has to be installed in the vehicle, and connected to the electrical supply circuit of the vehicle. Therefor, such device is expensive.

The present invention has among its objects the overcoming of the above-outlined disadvantages of prior portable electrical appliances with self-contained rechargeable batteries, and to provide small portable electrical appliances with self-contained rechargeable batteries, especially flashlights, which, without any supplemental means, can be plugged into the cigarette lighter receptacle which is normally provided on the dashboards of land, air, and sea vehicles.

In accordance with the present invention, at least one part of the appliance is provided with a plug which may selectively be mounted within the cigarette lighter receptacle of a vehicle, the plug providing for the electrical connection of the batteries of the appliance to the electrical supply circuit of the vehicle. In an illustrative embodiment of the appliance of the invention, the housing part to be plugged into the cigarette lighter receptacle of the vehicle has a cylindrical wall which is connected to one pole of a rechargeable battery. At the end of a cylindrical wall, and electrically isolated therefrom there is a contact which is electrically connected to the other pole of the rechargeable battery. When the housing is plugged into the cigarette lighter receptacle, the cylindrical wall of the housing makes electrical contact with the frame of the vehicle by way of a receptacle wall, and the contact at the end of the housing makes contact with the cigarette lighter receptacle.

In one preferred construction in accordance with the invention, the rechargeable batteries of the appliance may be molded into the body thereof to form permanent inserts therein. This apparatus is especially simple, stable, and rugged.

In a preferred construction in accordance with the invention the lightbulb-carrying head of a flashlight is rotatably mounted upon the body of the appliance, there being an on-off switch provided for the bulb, such switch being operated by the turning of the head relative to the body. This construction permits the elimination of the switches with outwardly extending handles or thumb buttons which are ordinarily employed on hand-held flashlights.

Another feature of a preferred embodiment of pocket flashlight in accordance with the invention is the provision of a parabolic reflector formed integral with the body of the flashlight. With such construction, a transparent, uncovered front lens can be pivotally mounted on the reflector so that it may be pivoted away therefrom and employed as a magnifying lens for reading documents such as maps and the like illuminated by the flashlight.

It is to be understood, however, that the invention is not restricted to a construction wherein the body per se of the appliance is so formed as to be receiveable in a cigarette lighter receptacle. It is necessary only that the body of the appliance have a part mounted thereon which may be plugged into a cigarette lighter receptacle, such plug in part preferably being movably connected to the body of the appliance so that it may be swung out of the way when the batteries of the appliance are not being charged.

In order to broaden the capability of the apparatus made in accordance with the invention, there may be provided an adapter which may be plugged into a wall receptacle of an ordinary lighting circuit, such adapter receiving the plug-in portion of the appliance. Such adapter is provided with plug pins on one end face for plugging into the usual light outlets, and with a rectifier and voltage reducing transformer, and with a resilient charging circuit-disconnecting contact, so that the appliance is connected to the charging circuit only when the appliance is plugged in for the charging of the batteries. This prevents the malfunctioning of the battery-charging adapter.

Further advantages and features of the invention will be obvious upon consideration of the following description in connection with the attached drawings which show preferred examples of the construction of the apparatus of the invention.

In the drawings:

FIG. 3 is a view in transverse section through the flashlight of FIGS. 1 and 2 and particularly showing the on-off switch thereof, the section being taken along the line 3—3 of FIG. 2;

FIG. 4 is a view showing a flashlight in accordance with FIGS. 1 and 2, the flashlight being shown mounted in a supplemental apparatus, shown in longitudinal axial section, which functions to charge the batteries of the flashlight from the ordinary lighting means of a house and the like;

FIG. 5 is a view partially in side elevation and partially in vertical section through a further embodiment of pocket flashlight made in accordance with the invention; and FIG. 6 is a view in end elevation of the flashlight of FIG. 5, the pivotally mounted plug thereof being shown folded into a vertical position, the view being taken in the direction from left to right in FIG. 5.

Figure 1:
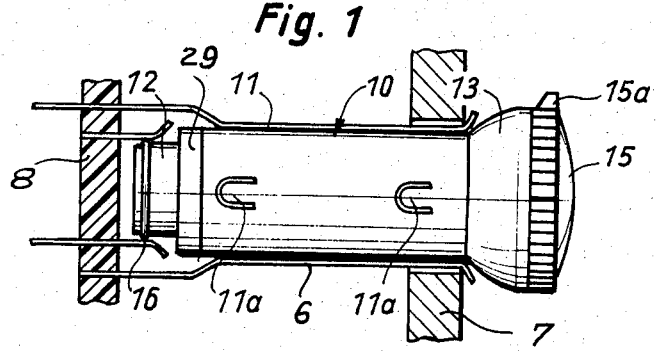
FIG. 1 is a view in side elevation of a flashlight made in accordance with the invention, such flashlight being shown mounted in a cigarette lighter receptacle of a motor vehicle for the charging of the batteries of the flashlight.
Figure 2:
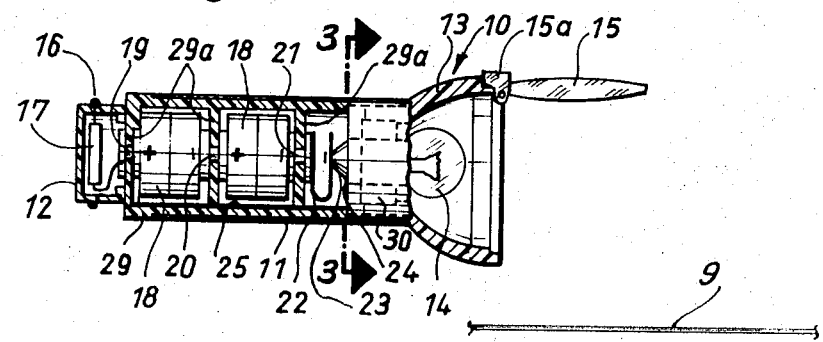
FIG. 2 is a view in longitudinal section through the flashlight per se of FIG. 1, the flashlight being shown illuminating a document such as a map, and the lens of the flashlight being shown to an open position wherein it functions as a magnifier to aid in the reading of the map.

A first embodiment of flashlight, generally designated by the reference character 10, is shown in FIGS. 1, 2, and 3. In FIG. 1 the flashlight 10 is shown mounted in a cigarette lighter receptacle 6 mounted in a dashboard 7 of an automobile for the recharging of the rechargeable batteries of the flashlight from the electrical circuit of the automobile. The flashlight 10 is small, being of such diameter and length as to fit into the receptacle 6 in the manner shown. The light 10 has a cylindrical housing formed by a generally cylindrical molded electrically insulating plastic body 29 over most of the length thereof, except for the rear end portion, there is disposed a cylindrical metal sheath 11. The rear end 12 of the body 29, likewise made of electrically insulating plastic material, has a diameter somewhat less than that of the portion 29. The metal sheath 11 has U-shaped tongues 11a projecting somewhat outwardly therefrom so as frictionally to retain the flashlight 10 within the receptacle 6, and to form a good electrical contact between the sheath 11 and the inner metal surface of the receptacle 6. It is to be understood that the receptacle 6 is connected to one side of the electrical circuit of the motor vehicle.

Integral with the body 29 there is formed at the forward end thereof a parabolic reflector 13, the inner surface of which is formed by a reflective metal coating. Normally closing the forward end of the reflector 13 there is a cap 15 made in the form of a lens which is pivotally supported to the reflector by a hinge 15a. When the lens 15 is in the reflector-closing position of FIG. 1, it creates an advantageous concentration of light beams. When the lens is in the swung-out position of FIG. 2, it functions as a magnifying lens for facilitating the inspection of a document such as a map 9, (FIG. 2), which may at the same time be illuminated by the energized lightbulb 14 of the flashlight.

As explained above, when the flashlight 10 is plugged into the cigarette lighter receptacle 6 of the vehicle, one pole or side of the vehicle electrical circuit is connected to the metal sheath 11 of the flashlight. The other pole or side of the electrical circuit of the vehicle is connected to a socket 8, insulated from the receptacle 6, socket 8 receiving and making electrical contact with an annular contact 16 mounted upon the supporting means 12. Within the means 12 there is disposed a current-limiting resistor 17 which is interposed in the charging circuit from the contact 16 and a contact 19 which engages the lower end of the casing of a first (left, FIG. 2) cell 18 of the battery. The central pole of such first cell 18 is connected through a contact 20 with a lower or rear end of the casing of a second cell 18 of the battery. The central pole of such second (right) cell is connected by a contact 21 to one leg of a U-shaped bent leaf spring 22, the other leg of such spring engaging the central contact 23 of the lightbulb 14. As shown, the contacts 19, 20, and 21 are supported in partitions or diaphragms 29a integral with the body 29 of the flashlight.

The flashlight 10 is provided with a rotatable head including a metal shell 30 (FIGS. 2 and 3). Two oppositely disposed leaf spring contact tongues 28 (FIG. 3) are welded to the metal shell 30 and are disposed selectively to connect a wire 25 which is molded into the body and is connected to the contact 19, to the outer sleeve contact 24 of the lightbulb 14. Placed on opposite sides of the base of the lightbulb 14 are two insulating pieces 26 which are so disposed that when the head including the metal shell 30 is turned into one position the portions 26a of the springs 28 engage the outer sleeve 24 of the lightbulb. The insulating pieces 36 have flute-type recesses into which the portions 26a of the contact points lock when the light 14 is turned off. Upon turning the head 90°, however, the contacts of the members 28 lie in the free space between the insulating pieces 26 and thus directly contact the base of the bulb, whereby the bulb is lighted.

Instead of the cylinder wall 11 shown in the embodiment of FIGS. 1, 2, and 3, which serves as a contact surface, the outer surface of the body may also be made of a synthetic molded resin which is integral with the body 29 of the flashlight, the cells 18 of the battery being molded into the body 29, and the only contacts on the body being in the form of a metallic band at one axially narrow zone of the body 29.

Figure 4:
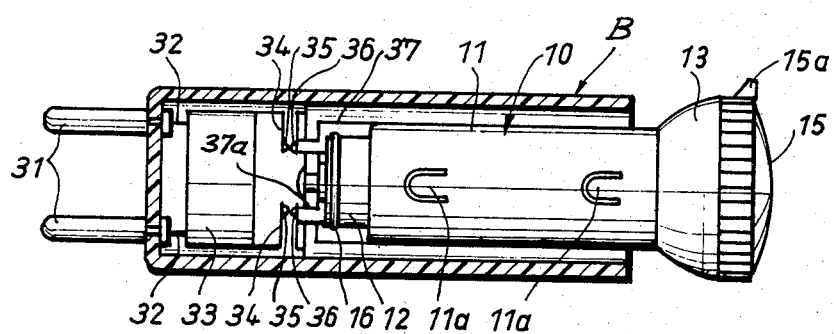

In FIG. 4 the flashlight 10 is shown mounted in a supplemental, battery-charging device generally designated B. Such device has a cup-shaped elongated body made of electrically insulating material, such as molded synthetic resin. Affixed to the rear, closed end of such body or housing are plug pins 31 adapted for being received in an electrical receptacle of a house lighting circuit. A wire 32 leads from the respective pins 31 to an electrical element 33 which includes a voltage decreasing transformer and a rectifier. From the element 33 wires 34 lead to respective first contacts 35 which with opposing respective contacts 36 form two circuit-breaking switches which are closed only when the flashlight 10 is plugged into the device B in the manner shown in FIG. 4. This eliminates the possibility of malfunctioning of the charging device. A wire 37 leads from the upper contact 36 (FIG. 4) to the electrically conducting shell or sheath 11 of the flashlight, while a connecting wire 37a leads from the lower contact 36 to the annular or base contact 16 of the flashlight 10.

In the embodiment of the flashlight shown in FIGS. 5 and 6 the housing thereof, designated generally by the reference character 50, is generally of a cubic form. Mounted upon the housing 50 is a battery-charging plug element 41 having a metallic contact sleeve surface 43 mounted upon an insulating piece 44 upon which an annular contact 45 is disposed. It will be understood that the internal circuitry of the flashlight including the batteries and the battery-charging contacts 43 and 45 are the same as those in the above-described embodiment of FIGS. 1–3, inclusive. The rechargeable batteries are designated 46 and 47; these are stored in the cubic housing part 50, in which there are also mounted a reflector 48, a cap 48a, and a lightbulb 49 energized by the batteries 46, 47. In order that the lamp may be securely mounted upon any ferro-magnetic surface, such as the body of an automobile, permanent magnets 52 are mounted upon opposite sides of the housing 50 of the flashlight.

When the batteries 46, 47 are to be charged, the plug 41 is pivoted into the position of FIG. 5, about the pivot pin 42 which connects it to the housing 50. The plug 41 may then be inserted into a cigarette lighter receptacle, in generally the same manner as the flashlight 10 in FIG. 1, so that the batteries may be charged from the electrical circuit of the vehicle. After the batteries have been thus charged, the plug 41 is withdrawn from the receptacle, and is folded downwardly so that it lies within a broad vertical groove (FIG. 6) in the housing 50 of the flashlight between the opposite magnets 52.

Although the invention is illustrated and described with reference to a plurality of preferred embodiments thereof, it is to be expressly understood that it is in no way limited to the disclosure of such plurality of embodiments, but is capable of numerous modifications within the scope of the appended claims.

What is claimed is:

1. An electrical appliance powered solely by means of a rechargeable battery, said appliance having a housing within which the battery is disposed, and means mounted on the housing to charge the battery from a cigarette lighter receptacle of a vehicle, said last named means comprising a plug member on the housing and receivable in the cigarette lighter receptacle of the vehicle, and contact means on the plug member for establishing a battery-charging electrical connection between the battery and the electrical circuit of the vehicle when the plug member is inserted into the receptacle, said receptacle has side walls and a bottom wall, a contact on its said side walls and a contact on said bottom wall, the housing of the flashlight being formed at least in part as a metallic sleeve, said sleeve comprising at least one outward projecting member which is in contact with a pole of the battery of the flashlight and frictionally engages said side wall of the receptacle, the plug member of the flashlight having a contact on the outer, free end thereof adapted for engagement with an electrical connection on the contact on the bottom wall of the cigarette lighter receptacle, and an electrical light receiving socket having an electrically conducting base and a parabolic-hollow reflector body surrounding the lightbulb-receiving socket, said body being rotatably mounted on the housing, and comprising an electrical switch interposed between the battery and the lightbulb, said switch having a part which is selectively turned to on and off positions by the rotation of the reflector body with respect to the housing of the flashlight, said lightbulb-receiving socket has an electrically conducting base, and the electrical switch includes an inner metal shell connected to the electrically conducting sleeve of the housing of the flashlight, at least one contact connected to such sleeve, said contact being in the form of a leaf spring, and an electrically insulating cam connected to the reflector body of the flashlight so as to rotate therewith, said cam engaging said contact so as selectively to permit the inner end of the contact to engage the electrically conducting base of the lightbulb receiving socket whereby to energize the lightbulb, and to bend the contact point away from engagement with said contact of the light bulb receiving socket whereby to deenergize the lightbulb.

2. An electrical appliance in accordance with claim 1, wherein the body of the plug member is made of electrically insulating material and the metallic sleeve is telescoped thereabout, and comprising a conductor extending through said insulating body from said contact means of the plug member to one pole of the battery.

3. An electrical appliance in accordance with claim 1, wherein the free end of the electrically insulated body of the plug member is of reduced diameter, and the second recited contact is in the form of a metal ring extending about said reduced diameter portion of the body of the plug member.

* * * * *